Figure 1:
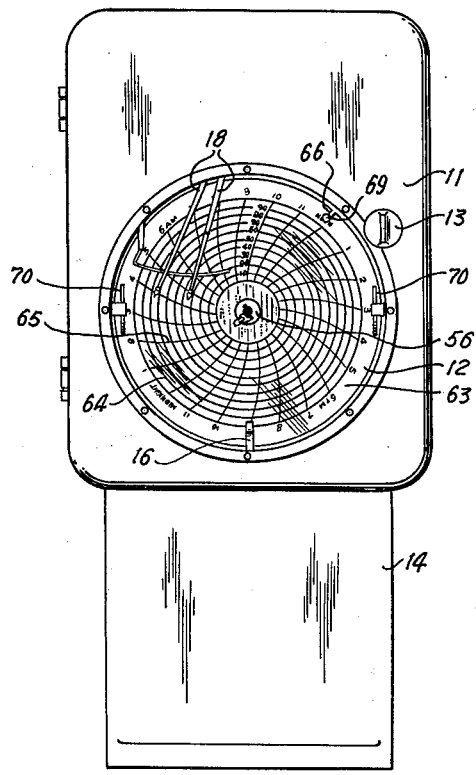

Nov. 5, 1963  O. E. MULLINS ETAL  3,109,694
CHART CHANGERS

Filed July 18, 1960  5 Sheets-Sheet 1

INVENTORS
Orvel E. Mullins
Oliver W. Cole

BY *Ashley & Ashley*

ATTORNEYS

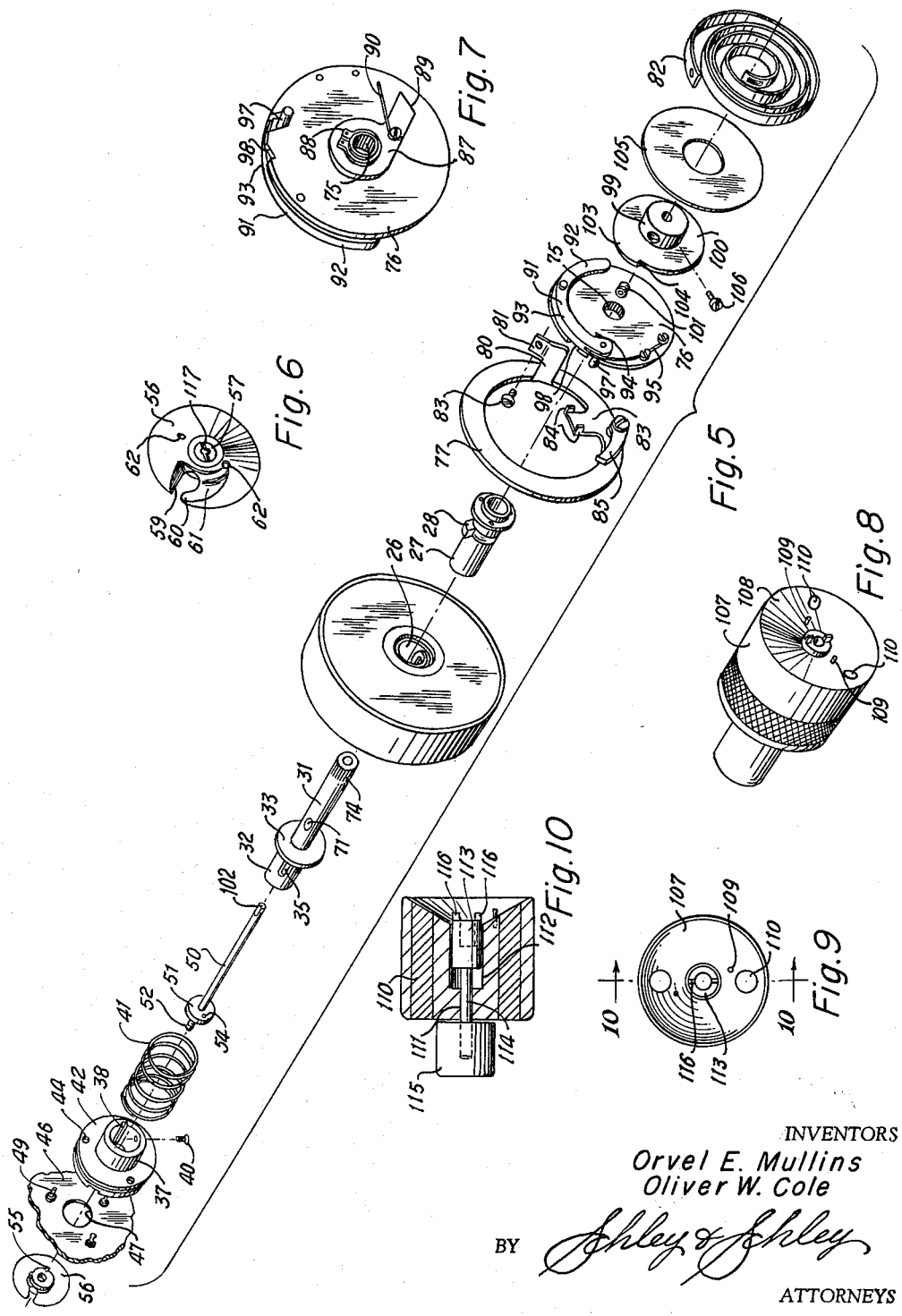

Nov. 5, 1963

O. E. MULLINS ETAL 3,109,694

CHART CHANGERS

Filed July 18, 1960

5 Sheets-Sheet 3

INVENTORS
Orvel E. Mullins
Oliver W. Cole

BY Ahley & Ahley

ATTORNEYS

Nov. 5, 1963

O. E. MULLINS ETAL 3,109,694

CHART CHANGERS

Filed July 18, 1960

5 Sheets-Sheet 5

INVENTORS
Orvel E. Mullins
Oliver W. Cole

BY *Ahley & Ahley*

ATTORNEYS

United States Patent Office 3,109,694
Patented Nov. 5, 1963

3,109,694
CHART CHANGERS
Orvel E. Mullins and Oliver W. Cole, Dallas, Tex., assignors to Mullins Manufacturing Company, a corporation of Texas
Filed July 18, 1960, Ser. No. 43,487
12 Claims. (Cl. 346—137)

This invention relates to new and useful improvements in chart changing mechanisms.

At this time, there are in use many recording mechanisms utilizing circular, revolving charts having on their faces circular graph forms upon which are recorded by one or more styli or pens, various data, such as temperature, pressure, and the like, in a continuous fashion. These charts are designed for recording data over a period of an hour or so, over the expanse of a day or a week, or even as much as a month. At some point, however, the chart will have made one complete revolution and must be replaced by a new chart if a continuous record of the observed data is to be maintained. Obviously, the charts operating over longer periods of time are more desirable from the latter viewpoint, whereas charts operating for shorter periods of time are more desirable with respect to the accuracy of the recorded data and the ease with which it may be read from the chart. Accordingly, it has been necessary for concerns which utilize these recording mechanisms to provide workmen whose sole duty is merely to go from one recording mechanism to another, changing the charts upon each recording mechanism and replacing it with a new chart. Quite apparently, in instances where a great number of recording mechanisms are in use, and especially where they are located at widely separated points, such as along a gas transmission pipe line, or over substantially the entire extent of an oil field, a great deal of time and labor expense are involved in providing the recording mechanisms with fresh recording charts as these are required.

The present invention is directed to an automatic chart changing mechanism functioning in broadly the same manner and utilizing broadly the same mechanisms as those disclosed in the co-pending application of Joe Daugherty, Serial No. 667,326, filed June 24, 1957, now U.S. Letters Patent No. 2,978,287, issued April 4, 1961, but includes certain refinements, improvements, and additions to and over the aforesaid application.

With these broad purposes in view, it is one object of the invention to provide an improved chart changing mechanism having improved means for receiving the discharge charts and for storing the same over indefinite periods of time while ensuring that the charts remain in proper chronological order, or in the order in which they were discharged from the recording mechanism.

An additional object of the invention is to provide an improved chart changing mechanism having means for maintaining the recording charts in a flat or planar position for the proper and accurate recording of data thereon; and further, in which the means for maintaining the charts in a planar configuration may be carried by the access closure invariably present on the housing in which the recording mechanism is enclosed whereby upon opening or removal of said closure, the chart flattening or retaining means will be moved from its operative position.

Yet another object of the invention is to provide an improved chart changing mechanism using a fly back device for discharge of the expended chart, the fly back mechanism employing a stop cam and pawl and in which means is provided for effectively and positively returning the pawl to stop engaging position after each actuation of the fly back mechanism.

Still another object of the invention is to provide an improved chart changing mechanism in which the chart disk upon which the charts are mounted for rotation is secured to the recording device by a snap fastener so that the disk is quickly and easily removed and replaced as may be desired for access to the recording mechanism or to the interior of the housing in which the mechanism is enclosed.

A further object of the invention is to provide an improved chart changing mechanism in which the chart disk upon which the charts are carried for rotation is easily revolved by hand with respect to the recording mechanism in order to set the charts at the proper time, for access to the winding key of the clock mechanism by which the recording structure is normally driven, or for other purposes; and in addition, in which is provided means for limiting the degree of rotation of the chart disks in that direction which would tend to impair the operation of the fly back mechanism.

Yet another object of the invention is to provide an improved chart changing mechanism so arranged with respect to the recording mechanism that the chart changing mechanism may be revolved by hand with respect to the recording mechanism to ensure proper operation regardless of the rotational position of the recording mechanism or the chart changing mechanism within the recording mechanism housing.

An additional object of the invention is to provide, as a sub-combination, a novel wrench or tool for removing and replacing the securing element by means of which the recording charts are held upon the chart disk.

A further object of the invention is to provide an improved chart changing mechanism in which the chart disk is provided with a plurality of openings near its center for ready access to the winding stem of the clock mechanism as well as for manual grasping of the disk or removal thereof without subjecting the disk to the likelihood of distortion or bending which occurs if the disk is grasped by its edge portions.

Still another object of the invention is to provide an improved chart changing mechanism having a novel structure for revolving the charts with the chart disk and by means of which the charts may be individually discharged in any desired rotational position of the chart disk.

An additional object of the invention is to provide an improved chart changing mechanism having a unique clutch or slip structure for permitting manual revolution of the chart disk independently of the clock mechanism.

Other and more particular objects will be apparent from a reading of the following description and the claims appended thereto along with reference to the accompanying drawings.

Figure 2:
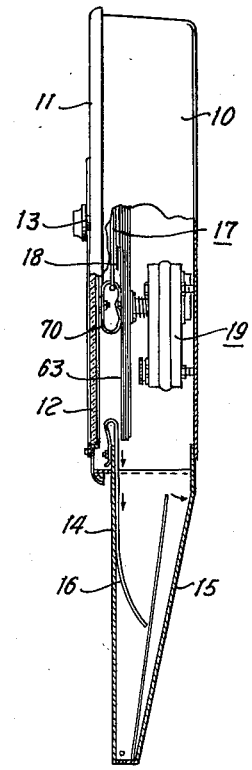
Figure 3:
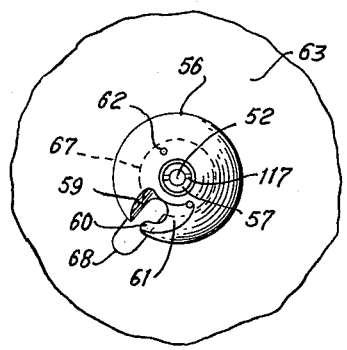
Figure 4:
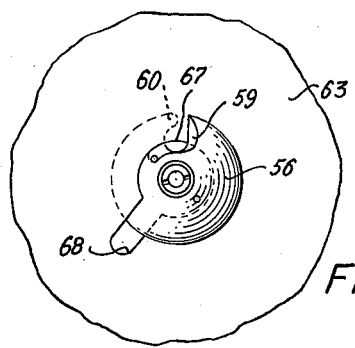
Figure 11:
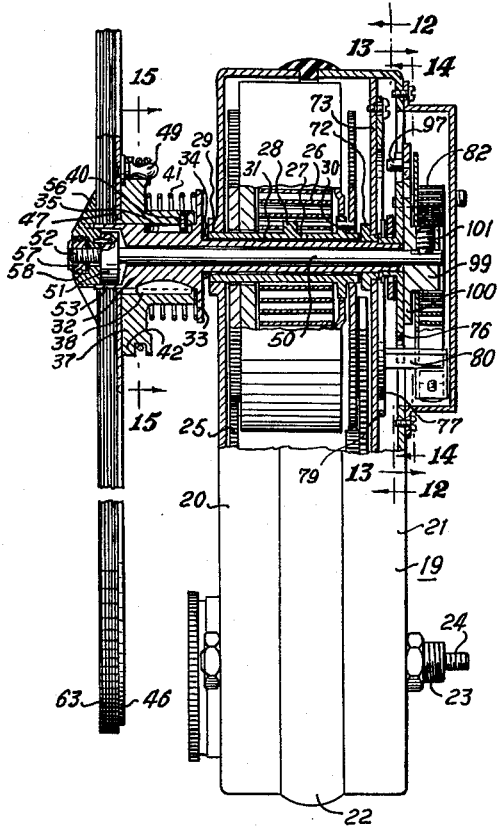
Figure 12:
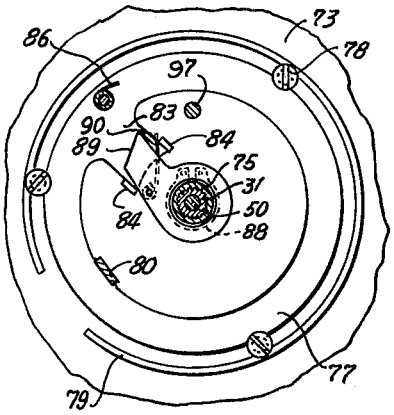
Figure 13:
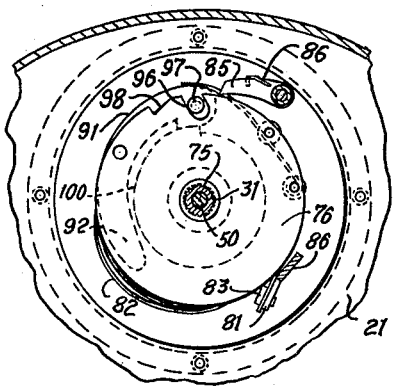
Figure 14:
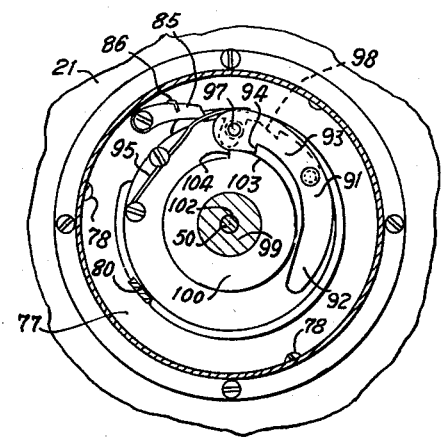
Figure 15:
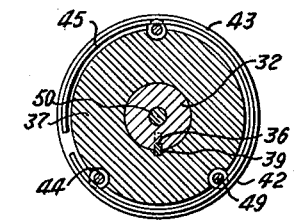
Figure 16:
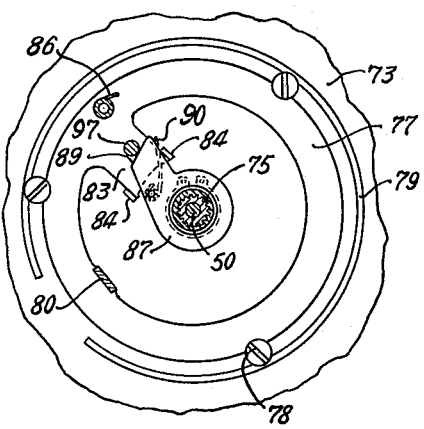
Figure 17:
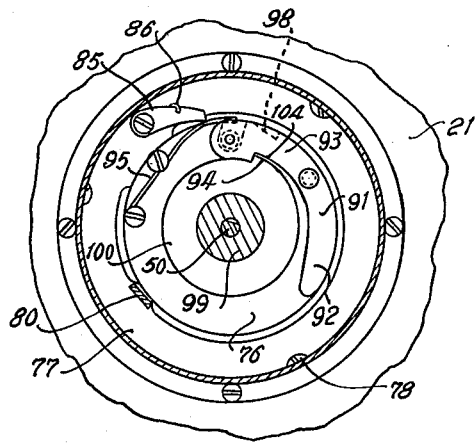
Figure 18:
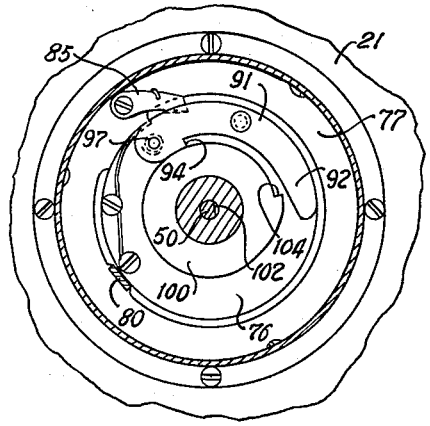
Figure 19:
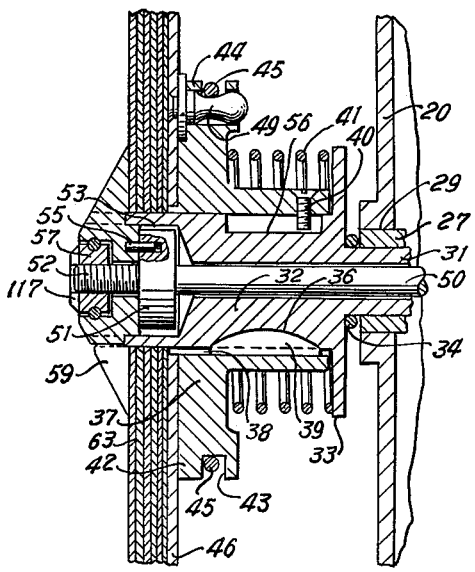
Figure 20:
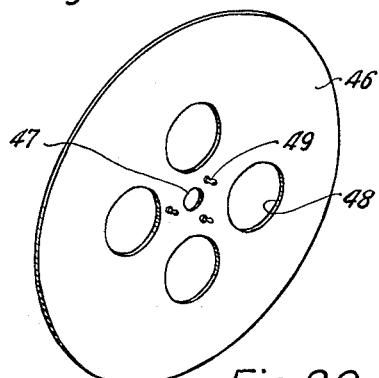
Figure 21:
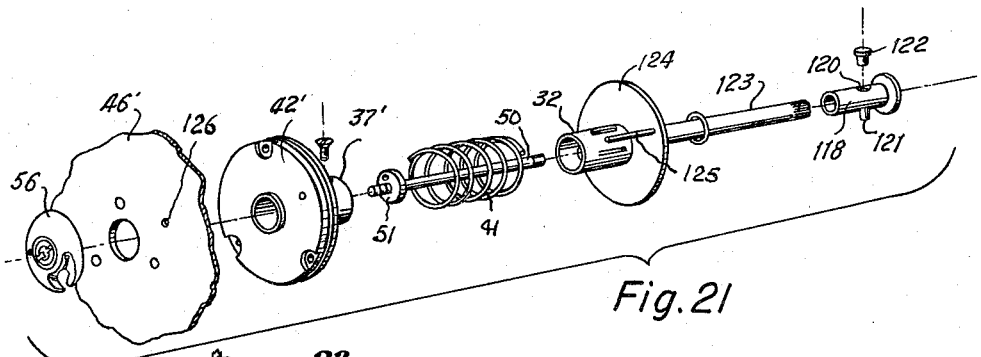
Figure 22:
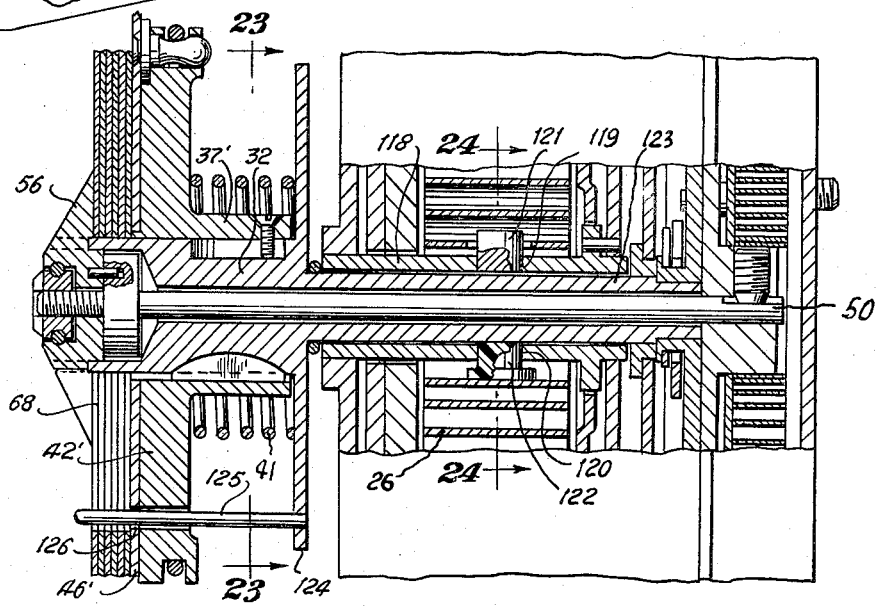
Figure 23:
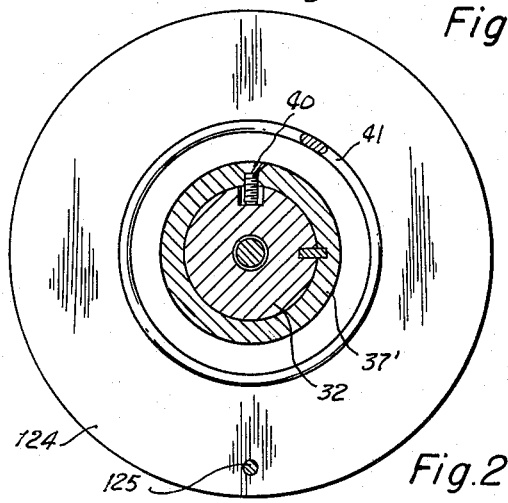
Figure 24:
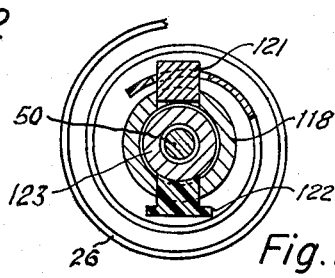

The invention will be more readily understood from a reading of the following specification and by reference to the accompanying drawings, wherein an example of the invention is shown, and wherein:

FIG. 1 is a front elevational view of a recording mechanism housing and showing the chart changing mechanism constructed in accordance with this invention positioned therein, FIG. 2 is a side elevational view of the recording mechanism housing, the housing being partially broken away to show the structures of this invention positioned therein, FIG. 3 is an enlarged, front elevational view of the retaining and discharging button which overlies the recording charts, FIG. 4 is a view similar to FIG. 3 showing the discharge button at an intermediate point in its discharge operation, FIG. 5 is an exploded view in perspective showing the driving train of the chart disk and the fly back mechanism, FIG. 6 is a view in perspective of the chart retaining and discharging button, FIG. 7 is a view in perspective of the forward side of the plate carrying the fly back pawl and the releasing cam, FIG. 8 is a view in perspective of the wrench for removing the retaining and discharge button from the discharge mechanism, FIG. 9 is an elevational view of the work engaging face of the wrench of FIG. 8, FIG. 10 is a vertical, cross-sectional view taken upon the line 10—10 of FIG. 9, FIG. 11 is an enlarged side elevational view partially broken away to show the structure of the discharge mechanism, FIGS. 12, 13, 14 and 15 are vertical, cross-sectional views taken upon the respective lines of FIG. 11, FIG. 16 is a view similar to FIG. 12 showing the cam arm in its deflected position, FIG. 17 is a view similar to FIG. 14 showing the latch finger and cam disk engaged, FIG. 18 is a view similar to FIG. 14 showing the cam disk nearing the point of re-engagement with the latch finger, FIG. 19 is an enlarged, fragmentary, sectional view of the central chart mounting structure, FIG. 20 is a view in perspective of the chart disk, FIG. 21 is an exploded view in perspective of a modified form of the chart and chart disk drive, FIG. 22 is an enlarged, fragmentary, vertical, sectional view of the modified form of chart drive, FIG. 23 is a vertical, cross-sectional view taken upon the line 23—23 of FIG. 22, and FIG. 24 is a vertical, cross-sectional view taken upon the line 24—24 of FIG. 22.

In the drawings, the numeral 10 designates a substantially rectangular housing for enclosing a recording mechanism of the type utilizing revolving circular charts upon which various data may be continuously transcribed in a graphical manner. The housing has hinged to its forward side an access door or closure 11 provided with the usual transparent window 12 through which the recording chart may be observed, the door being held in a closed position by the usual latch means having an exposed knob 13. A chart receptacle 14 depends from the lower wall of the housing 10 and has its open top projecting into the interior of the housing 10 from the open bottom thereof, the receptacle 14 being of sufficient internal dimensions as to accommodate a plurality of expended charts. The rearward wall 15 of the receptacle 14 is inclined, as shown in FIG. 2, and is disposed rearwardly of the chart carried by the recording mechanism and upon which data is currently being transcribed. An elongate, arcuate, quite flexible spring element 16 is carried by the upper portion of the receptacle 14, or by a part of the housing 10, as may be found suitable or desirable, the spring element 16 extending downwardly into the receptacle 14 and having its lower portion curved rearwardly toward the inclined rear wall 15 of the receptacle. The upper portion of the spring element 16 is disposed forwardly of the chart currently in operation so that as the chart is discharged from the recording mechanism and falls downwardly into the receptacle 14, it will be deflected rearwardly toward the rearward wall 15 of the receptacle and come to rest abutting or overlying the chart discharged immediately therebefore. In this manner, the operator is ensured of proper maintenance of the discharged charts in the chronological order in which data was recorded thereupon. The receptacle 14 may be provided with an access opening or door, may be removable from the housing 10 for withdrawal of the expended charts, or the charts may be removed from the open upper end of the receptacle through the door 11.

A recording mechanism, designated in general by the numeral 17, is enclosed within the housing 10 and normally secured to the rear wall thereof. Conventional data sensing apparatus (not shown) is positioned in the upper portion of the housing 10 and carries one or more recording styli or pens 18 for transcribing the observed data upon the recording charts.

A portion of the recording mechanism is shown in greater detail in FIG. 11 and includes a clock housing 19 formed of forward and rearward sections 20 and 21, respectively, having their adjoining edges receiving an annular sealing gasket 22. Suitable tubular studs 23 secure the clock housing sections together and carry telescoping screw-threaded bolts 24 by which the clock housing may be secured to the recording mechanism housing 10. A conventional clock mechanism, designated generally by the numeral 25, is enclosed within the clock housing 19 and includes a clock spring or spring motor 26 of the spiral type.

The chart driving mechanism includes a tubular shaft 27 extending axially of the clock spring 26 and having a radially extending lug 28 by which the shaft 27 is connected to the innermost convolution of the spring 26 for driving purposes. The forward end of the shaft 27 projects into a flanged opening 29 in the front wall of the front section 20 of the clock housing while the rearward end thereof is flanged and joined to one of the gear wheels of the clock mechanism 25, as indicated at 30. The clock mechanism, of course, functions to regulate the speed at which the spring 62 revolves the tubular shaft 27 and drives the same at a uniform rate, providing one revolution of the shaft 27 for each hour or each twenty-four hours or for such other period of time as the clock mechanism may be designed or desired to operate.

An elongate tubular drive sleeve 31 is received within the tubular shaft 27, projecting from the forward and rearward ends thereof, the forward end of the drive sleeve 31 carrying an integral cylindrical head 32 formed with an outwardly projecting, annular flange 33 at its point of juncture with the sleeve 31. Both the cylindrical head 32 and flange 33 are positioned forwardly or outwardly of the flanged opening 29 and a bearing ring 34 may be provided between the flange 33 and the forward end of the shaft 27. The head 32 is formed with a longitudinal groove 35 in its outer surface as well as a key way 36 (FIG. 15) and receives a flanged mounting hub or collar 37 in telescoping or reciprocal relationship. The hub 37 is formed with an internal keyway 38 registering with the keyway 36 and receiving a suitable key 39, and is also provided with a screw or suitable pin-like element 40 extending through its sidewall into the groove 35 for limiting reciprocal motion of the hub 37. A coiled spring 41 is confined between the radially outwardly extending flange 42 of the hub 37 and the flange 33 so as to urge the hub constantly outwardly with respect to the head 32. Thus, the hub 37 may be reciprocated over the head 32 by reason of the sliding engagement of the pin 40 and the groove 45 and the key 39 in the groove 38, but the key will function at all times to hold the hub against rotation with respect to the head 32. Of course, as the hub is moved inwardly over the head, the spring 41 is compressed, the spring functioning at all times to urge the hub constantly outwardly with respect to the head.

The flange 42 of the hub 37 is formed with a peripheral groove 43 intersected by a plurality of unevenly spaced or non-symmetrically spaced transverse openings 44 extending parallel to the axis of the hub 37. An arcuate compression spring 45 is received in the groove 43 and snugly engages the bottom thereof so as to intersect the openings 44 while being subject to outward movement within said openings. The openings thus form spring or snap sockets, or portions of snap fasteners, the purpose and function of which will be described hereinafter.

A flat, circular chart disk 46 of approximately the same or slightly smaller diameter than the conventional circular recording chart or graph, is provided with a central aperture 47 for engaging over the outer end of the head 32. The disk 46 is formed with a plurality of relatively large openings 48 in its central portion surrounding the aperture 47 and through which the operator may obtain access to the winding stem of the clock mechanism, and into which the operator may insert his fingers for manual removal of the disk from the recording mechanism by grasping the walls or peripheries of the openings 48. Since the disk 46 is necessarily rather thin and of light metal construction to minimize mass, the disk might readily be damaged if grasped for removal at its marginal portions, and the provision of the finger openings 48 thus brings to a minimum the likelihood of distorting or bending the disk during removal and replacement operations.

For securing the disk 46 to the hub 37, a plurality of headed pins 49 project from the rearward surface of the the disk parallel to the axis thereof, the pins 49 being unevenly or non-symmetrically spaced and arranged for registry with the openings 44 for quick and easy insertion therein. As the pins are forced through the openings 44, the spring 45 will be deflected and will snap back into snug engagement with the shanks of the headed pins 49 when the pins have fully traversed the openings 44 so as to snugly secure the chart disk 46 to the hub 37 by a snap action or snap fastener means. With this structure, the disk is easily attached to and removed from the hub 37 as such may be found necessary or desirable. At the same time, a secure rotative connection between the disk and the head is obtained, the uneven spacing of the pins 49 and the openings 44 ensuring proper rotational alignment between the disk and the head.

A thin, elongate fly back shaft 50 telescopes the bore of the tubular sleeve 31 and is provided on its forward end with a cylindrical collar 51 having projecting forwardly therefrom a screw-threaded pin 52 axially alined with the shaft 50. The collar 51 is received within a cylindrical recess 53 formed in the outer end of the head 32 and has an off-center opening 54 for receiving the locating pin 55 of a chart discharging button 56. A grooved retaining nut 57 is rotatably retained in the outer face of the button 56 by a snap ring 58 and receives the pin 52 in screw threaded engagement for securing the button 56 to the forward end of the shaft 50. The button 56, as shown in FIG. 6, is formed with a radial slot 59 opening from its periphery toward but not extended to its center part and having one sidewall in the form of a knife edge 60 offset slightly rearwardly from the opposite sidewall of the slot. The knife edge 60 is offset a distance approximately equal to the thickness of the conventional circular recording chart and merges smoothly into a wedge or cam surface 61 extended circumferentially of the button 56 from the knife edge. As will be seen more fully hereinafter, the button 56 is rotated periodically for the purpose of removing or peeling the uppermost chart from a stack of recording charts carried by the recording mechanism, and it will be seen that the knife edge 60 and wedge surface 61 cooperate to bring about such removal operation. For purposes to be discussed hereinafter, the button 56 is formed of a ferrous or magnetic material and is provided in its forward face with a pair of diametrically opposed recesses or openings 62.

A typical recording chart 63 is shown in FIG. 1, such charts normally comprising a circular sheet of paper having inscribed or imprinted thereon circular or annular abscissa lines 64 and arcuate ordinate lines 65 as commonly employed on charts of this type. The chart is also formed with a radial notch or slot 66 in one edge portion, a central aperture 67 (FIG. 4) which receives the forward end of the head 32, and a radial opening, slot, or notch 68 extending from the opening 67 outwardly toward the periphery of the chart and oriented at a fixed angle with respect to the marginal notch 66. In the form of chart illustrated, the notch 68 and the notch 66 are offset 180°, but as will appear more fully hereinafter, the angularity of offset may be of any suitable preselected magnitude.

A superposed stack of the charts 63 which may contain thirty charts or more is received upon the forward end of the head 32, the button 56 being removed for this purpose. The slots 66 and 68 of the charts are in registry, and the marginal notches 66 of each of the charts in the superposed stack thereof receive a headed pin 69 provided on the margin of the chart disk 46 and projecting forwardly therefrom. Thus, the charts are not only held against rotation with respect to the disk 46, but because they engage beneath the head of the pin 69 are held against forward movement or curling such as might occur under varying atmospheric conditions. It is to be noted that the central openings 67 of the charts underlie the button 56, the latter being larger in diameter than the opening 67, but that the notches 68 extend radially outwardly a distance greater than the radius of the button 56 so as to be exposed outwardly beyond the periphery thereof. Thus, as the button 56 is periodically rotated in the manner to be described hereinafter, the knife edge 60 will enter into the slot 68 as shown in FIG. 3, passing under one sidewall thereof and beneath the outermost chart, as shown in FIG. 4, the completion of one revolution of the button 56 thus effectively peeling or removing the outermost chart from beneath the button 56 and permitting it to fall into the receptacle 14.

For additionally ensuring the maintenance of the recording charts in flat or planar position a pair of approximately elliptical or oblong springs 70 are carried by the door or closure 11 and project inwardly therefrom so as to bear lightly upon the outermost chart of the stack of charts. The springs 70 are positioned at each side of the inspection window 12 so as to be moved from engagement with the charts when the door 11 is open, but being diametrically opposed as shown in FIG. 1 so as to hold the charts against curling or other deflection since the springs act to clamp the stack of charts lightly against the chart disk 46. The spring pressed hub 37, of course, constantly urges the center portions of the charts outwardly against the rearward side of the button 56, and as expended charts are removed, the hub continues to move outwardly, carrying the chart disk 46 therewith and constantly holding the outermost chart in engagement with the rearward side of the button 56 even when only one chart remains in position upon the head 32.

For revolving the chart disk 46 and the stack of charts carried thereby, the tubular sleeve 31 may have its external surface slightly roughened, peened or otherwise altered from an exactly cylindrical configuration as indicated at 71 in FIG. 5, so as to have frictional engagement with the bore of the shaft 27, or in the alternative, the bore of said shaft may be similarily altered. Thus, the equivalent of a clutch or a slip connection may be provided for transmitting torque between the shaft 27 and the sleeve 31 and thence to the head 32 and hub 37 for revolving the chart disk 46 and the charts carried thereby. At the same time, however, the slippable nature of this driving connection will permit the manual revolution of the disk 46 and hub 37 without simultaneous revolution of the shaft 27. By this means, the chart disk may be revolved to bring one of the openings 48 into proper position for access to the winding stem of the clock mechanism, or for setting the rotational position of the chart disk at the proper time indication. In some instances, these clock mechanism may run fast or slow and require speed adjustment, during which adjusting period the rotational position of the chart disk may need shifting for proper time indication, and the aforesaid provision for manual revoltuion of the chart disk independently of the driving mechanism allows such adjustment without disturbing any of the other elements of the structure.

The rearward portion of the sleeve 31 extends rearwardly of the back end of the shaft 27 and through a flanged bushing or bearing 72 supported in an intermediate, transverse partition 73 mounted within the clock housing 19. The portion of the sleeve 31 projecting through the bushing 72 is splined, as shown at 74 in FIG. 5, and engages within the splined hub 75 of a pawl disk 76. Thus, the disk 76 is rotatively locked to the sleeve 31, the head 32, and the hub 37, along with the chart disk 46. At the same time, however, the slippable connection between the sleeve 31 and the shaft 27 permits this entire assembly to be manually rotated with respect to the shaft 27.

As shown in FIGS. 11 and 12, a mounting or securing ring 77 is clamped to the rearward surface of the partition 73 in surrounding but rather widely spaced relationship with respect to the rearward end of the sleeve 31 which projects through the partition 77. To make provision for rotational or rotary adjustment of the position of the sleeve 77, a plurality of fastening screws 78 have their heads overlying the periphery of the ring 77 and also overlying an arcuate spacing member 79, which may be formed of wire or other suitable material, and which surrounds the periphery of the ring 77 in spaced relationship. Thus, as shown in FIG. 12, the element 79 is spaced outwardly from the periphery of the ring 77 to form an annulus through which the fastening screws 78 extend. The element 79 is desirably of approximately the same thickness as the ring 77 so that the screws 78 are provided with diametrically opposed clamping surfaces located in approximately the same plane for uniform clamping of the ring 77 to the partition 73. It is apparent that by loosening the screws 78, the ring 77 may be rotated to any desired position and again clamped to the partition 73 by tightening the screws 78.

The ring 77 carries a rearwardly extending arm 80 having an offset securing wing 81 to which the outer end of a spiral fly back spring 82 is connected by a screw 83. For purposes to be described more fully hereinafter, the spring 82 is coiled in a direction opposite to that in which the spring 26 is coiled and hence operates in opposition to the spring 26.

The ring 77 is also formed with a radially-inwardly extending arm 83 carrying a pair of spaced, rearwardly extending lugs 84. There is also carried on the ring 77 an arcuate pawl 85 positioned in the edge portion of the ring and being freely pivotal with respect thereto. A small spring 86, having one end secured beneath the attaching means of the pawl 85, constantly urges the pawl 85 to swing inwardly toward the center of the ring 77.

A cam arm 87 is rotatably mounted upon the splined hub 75 of the disk 76 and held thereon by a snap ring 88. The arm 87 extends approximately radially-outwardly from the center of the disk 76 and has its outer extremity shaped as a linear, inclined cam surface 89, the outer end of the cam arm being received between the lugs 84 of the ring 77. A short spring 90 is carried by the arm 87 and engages the clockwise lug 84, as viewed in FIG. 12, to urge the arm 87 constantly against the counterclockwise lug 84, again as viewed in FIG. 12. Thus, the arm 87 is permitted to undergo limited rotational movement between the lugs 84, but is otherwise held by the lugs against movement with respect to the disk 76.

On the rearward side of the disk 76, as shown in FIGS. 5 and 14, an elongate arcuate or non-rectilinear pawl member 91 is pivotally mounted intermediate its end portions so as to be swingable in an arc parallel to the rearward face of the disk 76. The pawl member 91 includes a rearward portion 92 and a forward portion 93, the forward portion terminating in an inwardly projecting fiinger or latch member 94 movable radially inwardly and outwardly with respect to the axis of the disk 76. An elongate spring 95 is mounted upon the rearward face of the disk 76 and engages the forward end of the pawl 91 to urge forward portion of the pawl member 91 constantly inwardly toward the center or axis of the disk. The disk 76, on its periphery, is formed with an approximately radial notch 96 underlying the latch portion 94 of the forward end of the pawl member 91, and a pin 97 carried by said latch portion extends forwardly through the notch 96 into the vertical plane of the outer end 89 of the cam member 87. The disk 76 is also formed with a pawl notch 98 in its periphery spaced a short distance clockwise of the notch 96, as viewed from the rearward side of the disk 76, and adapted to receive the inner end of the pawl 85 carried by the ring 77. The pawl 85 is, of course, spaced rearwardly of the ring 77 a distance sufficient to bring it into registry with the periphery of the disk 76.

The rearmost portion of the fly back shaft 50 extends rearwardly through the disk 76 and is received in the hub 99 of a cam disk 100, the disk 100 being secured to the shaft 50 by a set screw 101 received in the hub 99 and engaging a flattened face 102 on the rear extremity of the shaft 50.

The periphery of the cam disk 100 is approximately circular with the exception of an arcuate lobe 103 extending outwardly therefrom and including a flat radial latch face 104 facing oppositely to the face of the latch finger 94 and adapted to be engaged thereby to hold the cam disk 100 against rotation. A thin washer 105 is received upon the hub 99 abutting the rearward face of the cam disk 100 and isolating the cam disk from the convolutions of the spring 82. The innermost convolution of the spring 82, which overlies the hub 99, is suitably secured thereto as by the screw 106. The outer end of the spring 82 being secured to the ring 77, it will be seen that when the spring 82 is in a wound condition, it will tend to rotate the cam disk 100 and the fly back shaft 50 in a clockwise direction or in a direction opposite to that in which the chart disk 63 is revolved.

It will be seen from an examination of FIGS. 13 and 14 that the rearward portion 92 and the latch finger 94 of the pawl member 91 are so spaced from the center of the cam disk 100 that as the pawl member 91 pivots upon the pawl disk 76, both the forward and rearward ends of the pawl member 91 cannot be simultaneously spaced outwardly from the center of the cam disk 100 a distance greater than the outward projection of the lobe 103 or the latching face 104. Stating this in a different fashion, when the latching finger 94 is engaging the outer surface of the lobe 103, as shown in 14, the rearward end 92 of the pawl member 91 is spaced from the center of the cam disk 100 a distance less than the outer face of said lobe 103. The benefit of this structure is to be found in the releasing operation of the cam disk 100 in that as the forward end of the pawl member 91 is moved outwardly to disengage the latching finger from the latching face 104 and the cam disk revolves in a counterclockwise direction as viewed in FIG. 14, the lobe 103, before it can go through one complete revolution, must engage the rearward end 92 of the pawl element 91, forcing the forward end of the pawl member 91 to swing upwardly into a position to engage and latch the cam against more than one revolution. Thus, in the event the spring 95 should fail and not move the forward end of the pawl element 91 inwardly after the cam disk 100 has been released, the engaging of the lobe 103 with the rearward end 92 of the pawl element 91 will positively force the forward end of the pawl element 91 inwardly into a position where it will catch and engage the latching face 104 of the cam disk and hold the cam disk against more than one revolution.

It will also be seen that the pawl 85 by engaging in the notch 98 limits the rotation of the pawl disk 76 so that the spring 82 cannot be unwound to an excessive extent as the chart disk 46 is manually revolved either for access to the clock winding stem or for setting the indicated time, and also so that the ring 77 may not be rotationally adjusted sufficiently to unwind the spring 82 excessively. This will be discussed in greater detail in describing the operation of the assembly.

As a sub-combination tool for ready removal and replacement of the button 56 upon the screw-threaded pin 52, there is illustrated in FIGS. 8, 9, and 10 a duplex wrench unit for simultaneously engaging both the button 56 and its retaining nut 57. The wrench unit includes a primary wrench body 107 having in its forward end a conical recess 108 complementary to and receiving the conical forward face of the button 56. A pair of diametrically opposed pins 109 project into the recess 108 for engaging in the openings 62 of the button 56, and a pair of magnets 110 are embedded in the body of the primary wrench for magnetically securing and holding the button 56 to or within the recess 108.

The primary wrench body 107 is formed with an axial bore 111 opening from the rear of the wrench body 107 into an enlarged, elongate counterbore 112 extending into the apex of the recess 108. A secondary wrench body 113, of such length as to be completely received within the counterbore 112, is positioned in said counterbore and carries a shank 114 extending through the bore 111 and externally of the primary wrench body 107 for connection to an operating knob 115. A pair of spanner lugs 116 project from the outer end of the secondary wrench body 113.

The secondary wrench assembly is reciprocable within the primary wrench body due to the depth of the counterbore 112, and thus, the secondary wrench body 113 with its lugs 116 may be withdrawn completely into the counterbore, or may be projected forwardly therefrom as shown in FIG. 10. The nut 57 of the button 56 is provided with a transverse slot 117 for receiving the spanner lugs 116.

In the utilization of this tool, the secondary wrench is retracted and the primary wrench placed in position over the button, the primary wrench being rotated until the pins 109 enter the recesses 62. The button is now held against rotation. The secondary wrench is then advanced and rotated until the lugs 116 enter the slot 117, after which the secondary wrench may be revolved while the primary wrench is held stationary in order to unscrew the nut 57 from the pin 52. The magnets 110 hold the button 56 in the recess 108 and preclude the possibility that the button 56, which is relatively small, may be dropped and misplaced.

In replacing the button 56, the reverse procedure is employed, the button being revolved until the pin 55 enters the opening 54, after which the button is held against rotation with the primary wrench and the nut 57 screwed into position by rotation of the secondary wrench as described above.

In the operation of the recording mechanism it is important that the outermost chart be discharged when the pin 69 of the chart disk 46 and the marginal notches 66 of the charts 63 are at or somewhere near top dead center so that the charts may fall freely from engagement beneath the head of the pin 69. At the same time, however, various types and brands of clock mechanisms and their meter housings differ in physical characteristics, and in order to bring the charts into registry with the observation window 12 while at the same time rotationally positioning the fly back mechanism in order to ensure discharge of the charts at the aforesaid time, it may be desirable or necessary to loosen the screws 78 and rotationally adjust the entire fly back and chart changing mechanism. This being done, the clock mechanism and fly back mechanism may be properly mounted in the meter housing 10 and proper discharge of the charts ensured. Although the radial angularity between the notches 66 and the notches 68 of the charts is subject to unlimited variation, it must be established and fixed for any particular recording meter, and it is, of course desirable to establish this relationship at a fixed value for all meters employing this mechanism. Accordingly, since the angle of the button 56 at which it discharges the uppermost chart with respect to the angularity of the cam arm 87, and hence, the rotational position of the ring 77, is necessarily a fixed value, it becomes desirable to establish such angularity at a particular level and to correspondingly fix the angularity between the notches 66 and 68 of the charts to achieve uniformity. Of course, the angle at which the slot 68 is disposed when the chart is discharged is of no consequence, but again, it has been found desirable or convenient to place the slot 68 at diametric opposition to the slot 66.

Having angularly adjusted the discharge mechanism and mounted the entire assembly in the meter housing, the operator may then remove the button 56 and place a supply of charts on the chart disk 46, slipping the notches 66 of the charts over the pin 69 and engaging the center openings 67 of the charts over the head 32. The button 56 is then replaced with the tool shown in FIGS. 8, 9 and 10, and the chart disk manually rotated to bring the pens of the recording arms 18 to the point of proper time indication. During both the rotational adjustment of the ring 77 and the chart disk 76, the pawl 85 functions to prevent more than one total revolution so as to avoid excessive unwinding of the spring 82.

In the controlled and timed revolution of the chart disk, the shaft 27 will be driven by the spring 26 at a steady and controlled rate regulated by the clock mechanism 25 so as to drive the tubular sleeve 31, head 32, hub 37, and disk 46 through the slippable connection indicated at 71. The stack of charts is of course held against rotation with respect to the disk 46 by the pin 69 and rotated at the same rate as said disk so that the styli 18 may record the observed data upon the surface of the outermost chart as it revolves.

At this point, the latch finger 94 of the pawl element 91 will be in engagement with the latch face 104 of the cam disk 100, and as the charts are revolved in a counter-clockwise direction as viewed from the front of the meter housing, the pawl plate 76, which is splined to the sleeve 31 will be revolved to drive the cam disk 100 in a similar fashion. The outer end of the spring 82 being fixed to the ring 77 which, in turn, is fixed to the clock housing, and the inner end of the spring 82 being fixed to the hub 99 of the cam disk 100, the spring 82 will be wound as this counterclockwise rotation continues.

As the assembly nears the end of one complete revolution, the pin 97 which is being carried along with the pawl disk 76, will move slowly into engagement with the outer inclined face 89 of the cam arm 87 and will tend to shift the arm 87 to the right, as viewed in FIG. 12, bringing it against the right hand lug 84, after which further rotational movement of the cam arm 87 is precluded. The pin 97 continues to move over the outer face 89 of the cam arm and is thus moved slowly outwardly until it passes over the outermost point of the cam face 89, at which point, the latching finger 94 will have been lifted from engagement with the latching face 104, thus releasing the cam disk 100 and permitting the spring 82 to commence unwinding and revolving the cam disk 100. Since the disk 100 is secured to the fly back shaft 50, the button 56 will be quickly revolved in a clock-wise direction causing the knife edge 60 to enter into the slot 68 of the uppermost chart and pass under the chart as shown in FIG. 4. As soon as the lobe 103 of the cam disk 100 has moved from beneath the latch arm 194, the spring 95 will tend to return the latch arm to its latching position, thus kicking the cam arm 87 to its left hand position as shown in FIGS. 12, such movement of the cam arm 87 being supplemented through action of the spring 90. Further, and as pointed out hereinbefore, as the cam disk 100 nears the end of one complete revolution, it will necessarily engage the rearward portion 92 of the pawl arm 91 and positively and forcefully swing the forward portion 93 of the pawl arm inwardly to ensure that the latching finger 94 returns to latching position. Thus, as the cam disk 100 completes one full revolution, the latching face 104 will again come into engagement with the latching finger 94 and prevent further revolution of the cam disk 100 and the button 56.

All of this takes place very quickly and substantially instantaneously, and in no way effects the slow and continuous counterclockwise movement of the chart disk 46 and the charts 63. The button 56 is very quickly revolved through one revolution so as to pass completely under the central portion of the outermost chart surrounding the central opening 67 of said chart, and accordingly, the chart being deprived of all support, and the pin 69 being near top dead center, the chart quickly drops from the disk 46 into the receptacle 14. The styli 18 necessarily engage the charts very lightly and in no way hamper or preclude such dropping action. The styli 18 are immediately brought into registry and engagement with the next underlying chart which is accurately alined in a rotational fashion with the chart just discharged, and accordingly, the recording of data continues in a virtually uninterrupted fashion. Of course, as soon as the outermost chart is discharged, the spring 41 moves the hub 37 and the entire stack of remaining charts outwardly so that the outermost chart again engages the underside of the button 56, and the recording of data continues as before. This action is repeated, each outermost chart being discharged after one complete revolution of the chart disk 46, and the button 56 revolving with the charts during this period so that there is no frictional resistance between the button and the charts to overcome.

Assuming as an example that twenty-four hour recording charts are being utilized and that it is desired that the recording mechanism operate for a calendar month without attention, some thirty-three to thirty-five of the charts 63 would be employed in order to provide a safety factor in the event the operator became unable to service the recording mechanism promptly at the end of the month. The button 56 would be removed and the chart disk 46 manually revolved, if necessary, to provide access to the clock winding stem through one of the openings 48 of the chart disk. Possibly the chart disk might require removal for access to the speed adjusting mechanism of the clock or for other purposes such as access to other meter components within the meter housing 10 which might be partially covered by the marginal portions of the chart disk. In this event, the disk is merely grasped manually by the openings 48 and slipped outwardly to disengage the pins 49 from the openings 44. After the operator completes whatever adjustments may be necessary, the disk is again slipped into position with the pins engaging in the openings 44 and being held therein by the spring 45, it being noted that improper rotational repositioning of the chart disk is precluded by the uneven or non-symmetrical spacing of the pins and openings. The requisite number of charts 63 are then placed upon the chart disk and the button 56 replaced, after which the chart disk may be manually revolved to the proper time indication.

Thereafter, the recording mechanism may remain unattended for the predetermined period of time, each chart being automatically discharged as it becomes expended and being dropped into chronological storage within the receptacle 14. The charts will be held in a flat or planar condition at all times by reason of the headed pins 69 and the springs 70, so that changes in weather, such as changes in temperature or humidity, are precluded from impairing the recording operation through the causing of curling or crimping of the chart sheets.

It is to be noted, of course, that the marginal notch 66 may extend slightly into the recording area of the chart 63 without likelihood of impairment of the recording operation, and further, that the central slots or notches 68 may be at any suitable or desirable angle with respect to the marginal notches 66 and that more than one of the central notches 68 may be employed. Thus, the fly back mechanism may readily be arranged to undergo one-half or one-third or even one-quarter of a revolution upon each actuation rather than one full revolution although the latter has been found to be by far the simplest arrangement and the most desirable. Of course, the button 56 would be correspondingly modified if less than one full revolution thereof is to be employed for the discharging function, but again, the use of the almost completely circular button and the increased retaining surface of the button thereby provided, has been found preferable.

A modified form of the invention is illustrated in FIGS. 21 through 24, the principal differences over the first described form being in the means for driving the individual recording charts and the chart disk and in the slippage connection between the shaft 27 and the sleeve 31. The shaft 27 is replaced by a shaft 118 similar in all respects to the shaft 27 but from which the lug 28 has been omitted. Instead, diametrically-opposed openings 119 and 120 are drilled in the wall of the shaft 118, the opening 119 having pressed therein a metal stud 121 which projects laterally of the shaft 118 and receives the inner convolution of the spring 26 in the same manner as the lug 28. In the opposite opening, 120, a headed friction member or button 122, preferably formed of a suitable synthetic resin, is received in sliding relationship, the inner convolution of the spring 26 constantly pressing upon the projecting head of the friction member 122 and urging it inwardly into snug frictional engagement with the shank of the sleeve 123 which replaces the sleeve 31. Thus, there is a frictional drive between the shaft 118 and the sleeve 123, but the shaft may undergo independent manual rotation apart from the sleeve.

For driving the charts with the chart disk the flange 33 is replaced with a somewhat larger flange 124 disposed between the sleeve 123 and the head 32, the flange 124 being greater in diameter than the button 56 and carrying a marginal pin 125 which projects forwardly through the enlarged flange 42' of the hub or collar 37', and through an opening 126 in the chart disk 46' and into the central slots 68 of the recording charts 63. With this structure, the marginal notch 66 may be omitted along with the driving pin 69 of the chart disk, and it hence becomes unnecessary for the charts to be discharged when the notch 66 is at or near a top dead center position. Instead, the charts may be discharged when the notches 68 are in any suitable or desirable rotational position since the pin 125 projects only slightly forwardly of the outermost chart. Of course, as charts are discharged, the spring 41 will constantly move the chart disk 46' outwardly toward the button 56 and maintain this relationship between the outer end of the pin 125 and the outermost chart. With this arrangement, the chart changing mechanism may be set to discharge the outermost chart at any desired hour of the day or night or at any point during one revolution of the chart disk 46.

The foregoing description of the invention is explanatory thereof and various changes in the size, shape and materials, as well as in the details of the illustrated construction may be made, within the scope of the appended claims, without departing from the spirit of the invention.

What we claim and desire to secure by Letters Patent is:

1. A mechanism for automatically changing circular recording charts including, means for periodically discharging the outermost chart of the stack of charts, a driving hub member for supporting a stack of superposed recording charts having a central aperture with a radial opening adjacent thereto, means for revolving the hub member, means for supporting the revolving means, a chart disk member carried by the hub member, the discharging means including a fly back mechanism having a cam with a pawl-receiving projection extending therefrom, and a non-rectilinear pawl pivotally mounted intermediate its ends to the fly back mechanism, the pawl having a front portion extending from one side of its pivot and carrying a latching portion projecting radially inwardly toward the periphery of the cam for engaging the projection of said cam, and the pawl having a rearward portion extending from the opposite side of its pivot, the rearward portion having a section extending radially inwardly toward the periphery of the cam a distance such that when the latching portion of the front portion of the pawl is spaced from the axis of the cam a distance equal to the spacing of the cam projection from the axis of the cam the section of the rearward portions of the pawl is spaced from the axis of the cam a distance less than the spacing of said projection from said axis of the cam.

2. A mechanism as set forth in claim 1 and means for adjusting the discharging means rotationally with respect to the means for supporting the revolving means.

3. A mechanism as set forth in claim 2 wherein the means for adjusting the discharging means includes a mounting ring for the discharging means and elements releasably clamping the mounting ring to the means for supporting the revolving means.

4. A mechanism as set forth in claim 1 and means for adjusting the chart disk member rotationally with respect to the means for supporting the revolving means.

5. A mechanism as set forth in claim 1 wherein the discharging means includes means securing the charts to the chart disk member, and an independently rotatable element screw-threadedly engaging the discharging means, the rotatable element having readily accessible means for receiving a rotating member, and the securing means having separate readily accessible means for receiving a separate rotating member.

6. A mechanism as set forth in claim 1 and means for revolving the stack of charts including a pin extending from the revolving means into the radial opening of the charts.

7. A mechanism as set forth in claim 1 wherein the means for revolving the hub member is spring means, and a frictional driving connection between the hub member and the spring means, the driving connection including a friction element constantly urged by the spring means into frictional driving relationship with respect to the hub member.

8. A mechanism as set forth in claim 1 and a releasable snap connection between the disk member and the hub member for securing the disk member to the hub member.

9. A mechanism as set forth in claim 1 wherein one of the disk and hub members is provided with a plurality of headed pins extending parallel to its axis and the other member is provided with a plurality of matching apertures receiving the pins, and resilient spring means in the apertures for releasably engaging the pins.

10. A mechanism as set forth in claim 1 and a slippable driving connection between the hub member and the revolving means therefor whereby the hub member and disk member may be manually revolved independently of the revolving means.

11. A mechanism as set forth in claim 1 wherein the discharging means includes means securing the charts to the chart disk member, and an independently rotatable element screw-threadedly engaging the discharging means, the rotatable element having readily accessible means for receiving a rotating member, and the securing means having separate readily accessible means for receiving a separate rotating member, and a snap ring rotatably securing the rotatable element to the chart securing means.

12. A mechanism as set forth in claim 1 and means for adjusting the chart disk member rotationally with respect to the means for supporting the revolving means, and means for limiting the degree of rotational adjustment of the chart disk member with respect to the means for supporting the revolving means.

References Cited in the file of this patent

UNITED STATES PATENTS

| | | |
|---|---|---|
| 506,988 | Fecht | Oct. 17, 1893 |
| 1,572,207 | Hodgkinson | Feb. 9, 1926 |
| 2,336,933 | Hicks | Dec. 14, 1943 |
| 2,381,188 | Swindle | Aug. 7, 1945 |
| 2,703,745 | Smith | Mar. 8, 1955 |
| 2,770,991 | Myers | Nov. 20, 1956 |
| 2,881,648 | Hottle | Apr. 14, 1959 |
| 2,926,059 | Squier | Feb. 23, 1960 |
| 2,978,287 | Dougherty | Apr. 4, 1961 |
| 3,064,261 | Maeder | Nov. 13, 1962 |

FOREIGN PATENTS

| | | |
|---|---|---|
| 646,988 | Great Britain | Dec. 6, 1950 |